April 22, 1941. H. C. LORD 2,239,299
JOINT
Filed April 7, 1939

INVENTOR
Hugh C Lord

Patented Apr. 22, 1941

2,239,299

UNITED STATES PATENT OFFICE 2,239,299

JOINT

Hugh C. Lord, Erie, Pa., assignor to Lord Manufacturing Company, Erie, Pa., a corporation of Pennsylvania Application April 7, 1939, Serial No. 266,481

1 Claim. (Cl. 287—85)

The present invention involves rubber joints, particularly such rubber joints as are used for connecting a supporting member with a supported member usually for the purpose of taking up vibration. The invention is designed to simplify such structures both as to their manufacture and as to the installation of such structures in use. Features and details of the invention will appear from the specification and claim.

Figure 1:
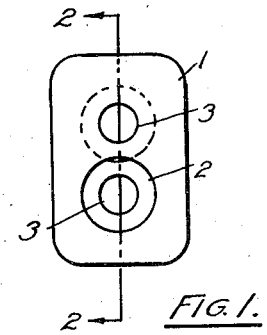

Preferred embodiments are illustrated in the accompanying drawing as follows:

Fig. 1 shows an elevation of a joint.

Figure 2:
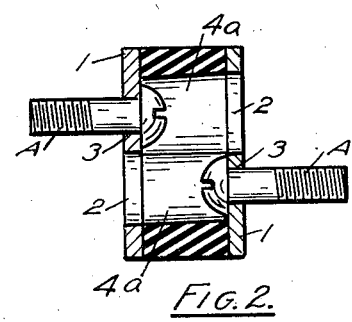

Fig. 2 a section on the line 2—2 in Fig. 1.

Figure 3:
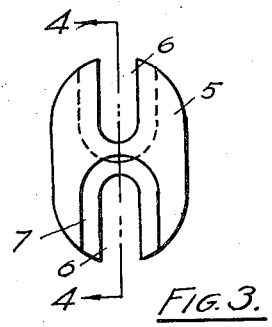

Fig. 3 an elevation of a modification.

Figure 4:
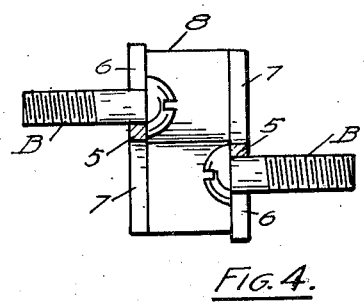

Fig. 4 a section on the line 4—4 in Fig. 3.

Considering Figs. 1 and 2, opposing plates 1—1 are provided with opposing access and securing openings 2 and 3, each plate having a securing opening with an opposed access opening. An element of resilient material, such as rubber, is secured to the opposing plates, preferably by bonding, and bridges the space between the plates. This rubber is provided with openings 4a which are in register with the access openings 2. When in use the joint is placed between a supporting and supported body, and securing means, such as screws A, extend through the securing openings and these screws may be introduced and set up through the access openings 2.

It will be noted that the securing openings in the opposing plates are very slightly off-set from the centers of the plates, this off-setting being less than the off-setting of the securing openings from the edges of the plates, preferably the off-setting from the centers giving practical room for clearance of the two access openings and the heads of the securing means. By placing these securing openings so close together there is very little leverage through a thrust on either of the plates tending to swing the plate on the securing means of the opposite plate. For this reason these joints may be readily substituted for what is known as step-bolt mountings where the securing means is ordinarily integral or initially rigid with the plates. Studs so fixed to the plates, and particularly to both plates, make it difficult to secure the plates under many conditions, particularly where the joint must be moved sidewise to place before the securing means are introduced. Further, the manufacture of these joints involving merely the small stamped plates with the perforations is very much cheaper than the structures which include the securing means as an integral part of the structure.

In the modified structure of Figs. 3 and 4 opposing plates 5 are provided with securing slots 6, the inner ends of the slots forming a securing area of these openings. Access slots 7 are formed in the plates opposite the securing slots and a resilient element 8 bridges the space and is secured, preferably by bonding, to the plates 5. In use, the securing means, such as screws B, may be introduced sidewise through the slots or may be entered in the supported or supporting means and the mountings moved sidewise to position, the screws entering the slots as the mounting is moved to place. The screws then may be set up through the access openings. This use of slots, therefore, simplifies the installing of the device under certain conditions. Here, as in the preferred structure, it is possible to put the securing means with so little off-set as to center of the plates that there is almost no tendency of the plates turning when they are subjected to thrust at right angles to a line joining the centers of the slots.

This structure provides a very cheap construction. The joints ordinarily are set up so as to take the load in shear as illustrated, but they may be used where the rubber is taken in compression or tension.

What I claim as new is:

A joint assembly having opposing plates, each plate having a securing opening and an access opening, the access opening being opposite the securing opening of the opposing plate; means bridging the space between the plates of resilient material such as rubber secured to the opposing faces of the plates and provided with access openings registering with the access openings of the plates and giving access to securing means in the securing openings, said securing openings being positioned closely adjacent to each other and off-set from the centers of the plates a distance less than the off-setting of the securing openings from the edges of the plates.

HUGH C. LORD.